(12) United States Patent
Hung (10) Patent No.: US 10,753,443 B2
(45) Date of Patent: Aug. 25, 2020

(54) GEAR DEVICE FOR CLUTCH

(71) Applicant: Jen-Che Hung, Taichung (TW)

(72) Inventor: Jen-Che Hung, Taichung (TW)

( * ) Notice: Subject to any disclaimer, the term of this patent is extended or adjusted under 35 U.S.C. 154(b) by 256 days.

(21) Appl. No.: 16/035,686

(22) Filed: Jul. 15, 2018

(65) Prior Publication Data

US 2020/0017095 A1     Jan. 16, 2020

(51) Int. Cl.
    *F16H 29/12*      (2006.01)
    *F16H 37/04*      (2006.01)

(52) U.S. Cl.
    CPC ............. *F16H 29/12* (2013.01); *F16H 37/04* (2013.01)

(58) Field of Classification Search
    CPC ......................... F16H 29/12–18; F16H 31/001
    See application file for complete search history.

(56) References Cited

U.S. PATENT DOCUMENTS

| | | | |
|---|---|---|---|
| 5,259,259 A * | 11/1993 | Inokuchi | B25B 13/467 192/48.92 |
| 8,201,479 B2 * | 6/2012 | Klein | B41J 13/103 192/48.92 |
| 8,413,547 B2 * | 4/2013 | Yang | F16H 3/003 475/12 |
| 2008/0295626 A1 * | 12/2008 | Jayasuriya | F16H 31/001 74/117 |
| 2017/0234405 A1 * | 8/2017 | Noia | F16H 1/20 74/88 |
| 2020/0200246 A1 * | 6/2020 | Noia | F16H 31/001 |

* cited by examiner

*Primary Examiner* — Michael McCullough (57) ABSTRACT

A gear device for a clutch contains: a drive gear, a first clutching member, and a second clutching member. The drive gear includes multiple first actuation protrusions and multiple second actuation protrusions, wherein each of the multiple first actuation protrusions has a beveled face and a flat top face, and each of the multiple second actuation protrusions has a beveled face and a flat top face. The first clutching member includes multiple third actuation protrusions, each of the multiple third actuation protrusions has a beveled face and a flat top face, and the first clutching member includes a first positioning disc and a first resilient element. The second clutching member includes multiple fourth actuation protrusions, each of the multiple fourth actuation protrusions has a beveled face and a flat top face, and the second clutching member includes a second positioning disc and a second resilient element.

2 Claims, 8 Drawing Sheets

GEAR DEVICE FOR CLUTCH

FIELD OF THE INVENTION

The present invention relates to a gear device for a clutch which operates clockwise and counterclockwise repeatedly so as to transmit kinetic energy constantly.

BACKGROUND OF THE INVENTION

Because of the shortage of oil and the increasing air pollution, all countries in the world are actively investing in the development and research of alternative energy sources.

The present invention has arisen to mitigate and/or obviate the afore-described disadvantages.

SUMMARY OF THE INVENTION

The primary aspect of the present invention is to provide a gear device for a clutch which operates clockwise and counterclockwise repeatedly so as to transmit kinetic energy constantly.

Another aspect of the present invention is to provide a driven gear which rotates in a direction the same as the actuated gear by using the transmitting gear assembly so that the drive shaft operates smoothly.

DETAILED DESCRIPTION OF THE PREFERRED EMBODIMENTS

Figure 1:
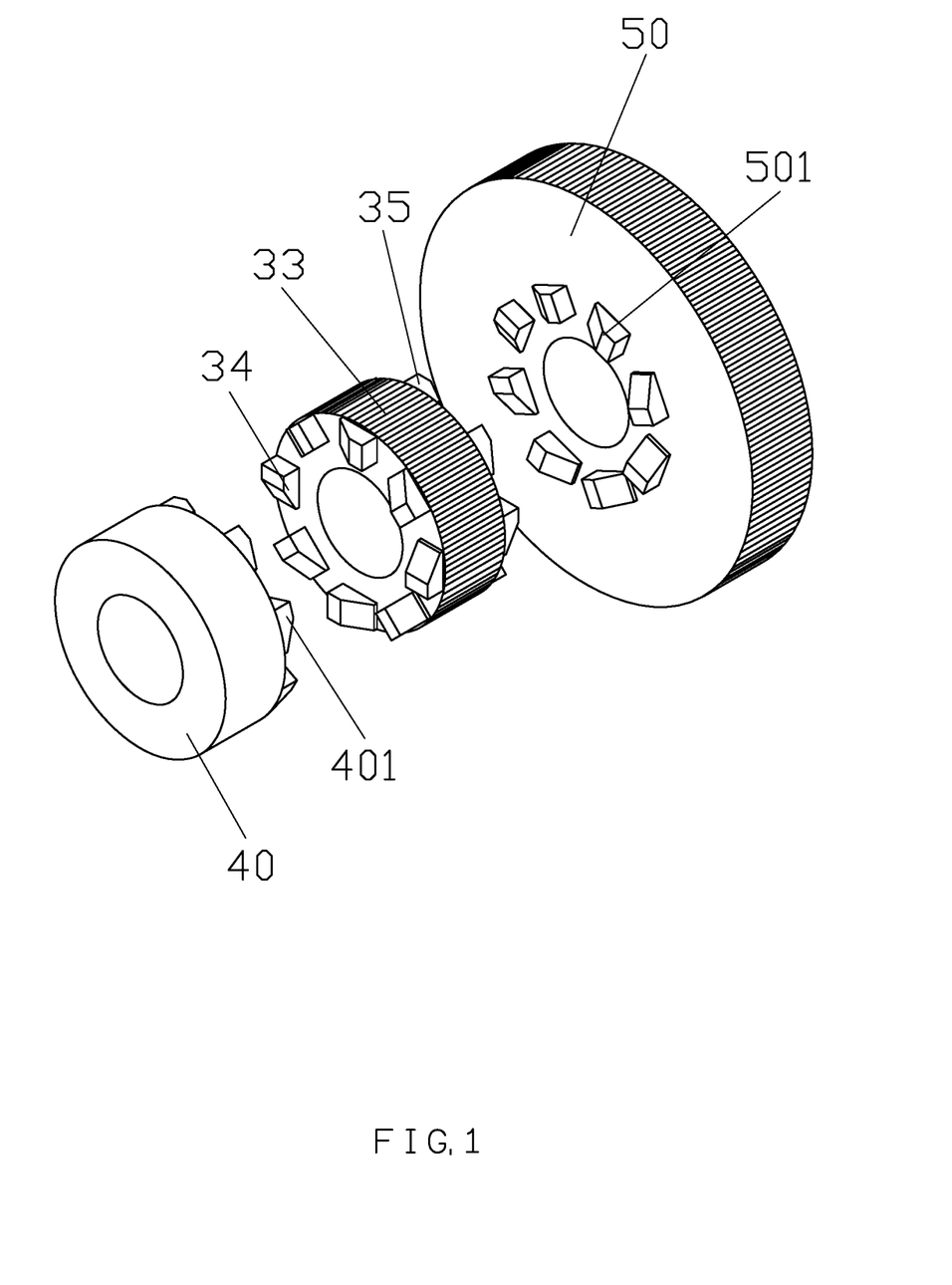
FIG. 1 is a perspective view showing the assembly of a gear device for a clutch according to a preferred embodiment of the present invention.
Figure 2:
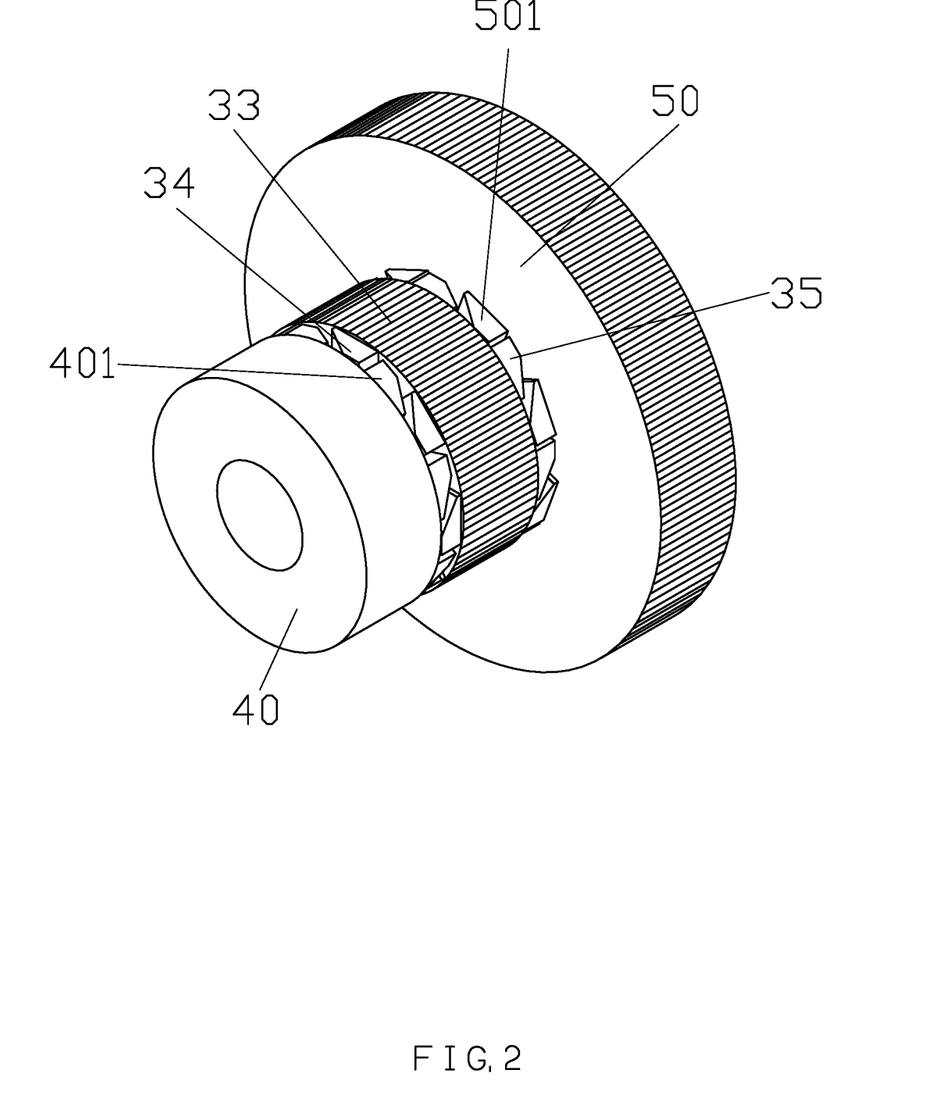
FIG. 2 is a perspective view showing the assembly of the gear device for the clutch according to the preferred embodiment of the present invention.
Figure 3:
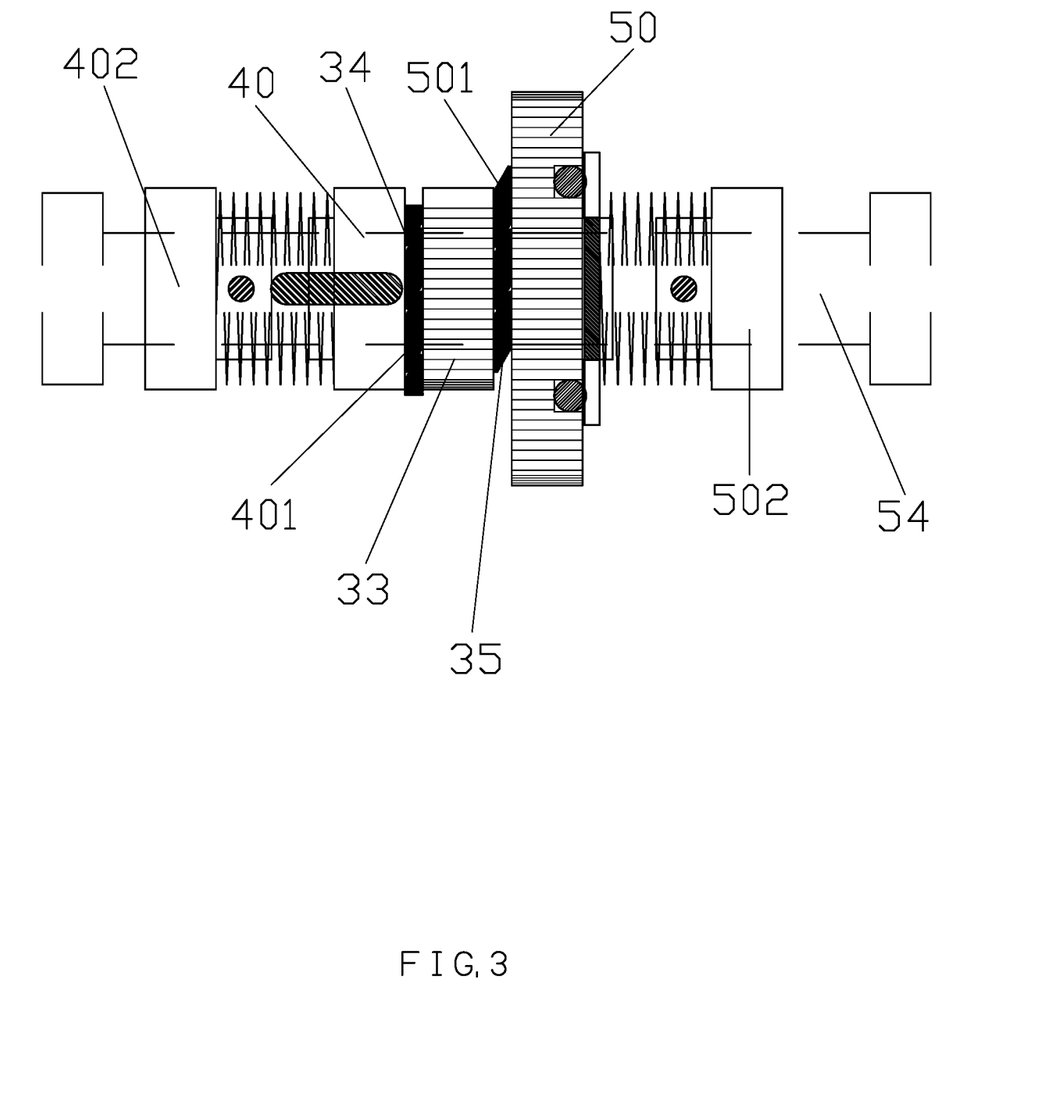
FIG. 3 is a cross sectional view showing the operation of the gear device for the clutch according to the preferred embodiment of the present invention.

With reference to FIGS. 1-3, a gear device for a clutch according to a preferred embodiment of the present invention comprises: a drive gear 33, a first clutching member 40, and a second clutching member 50.

The drive gear 33 includes multiple first actuation protrusions 34 arranged around a peripheral side of a first surface thereof, and the drive gear 33 includes multiple second actuation protrusions 35 arranged around a peripheral side of a second surface thereof opposite to the multiple first actuation protrusions 34 respectively, wherein each of the multiple first actuation protrusions 34 has a beveled face and a flat top face connected with the beveled face of each first actuation protrusion 34, and each of the multiple second actuation protrusions 35 has a beveled face and a flat top face connected with the beveled face of each second actuation protrusion 35.

The first clutching member 40 is disposed on a gear shaft 54 outside the drive gear 33, and the first clutching member 40 includes multiple third actuation protrusions 401 arranged around a peripheral side of a first surface thereof and corresponding to the multiple first actuation protrusions 34 of the drive gear 33 respectively, wherein each of the multiple third actuation protrusions 401 has a beveled face and a flat top face connected with the beveled face of each third actuation protrusion 401, and the first clutching member 40 includes a first positioning disc 402 fitted on the gear shaft 54 adjacent to a second surface of the first clutching member 40, wherein a first resilient element 43 is defined between the first clutching member 40 and the first positioning disc 402.

The second clutching member 50 is mounted on the gear shaft 54 adjacent to the drive gear 33, and the second clutching member 50 includes multiple fourth actuation protrusions 501 arranged around a peripheral side of a first surface thereof and corresponding to the multiple second actuation protrusions 35 of the drive gear 33 respectively, wherein each of the multiple fourth actuation protrusions 501 has a beveled face and a flat top face connected with the beveled face of each fourth actuation protrusion 501, and the second clutching member 50 includes a second positioning disc 502 fitted on the gear shaft 54 adjacent to a second surface of the second clutching member 50, wherein a second resilient element 55 is defined between the second clutching member 50 and the second positioning disc 502.

Figure 4:
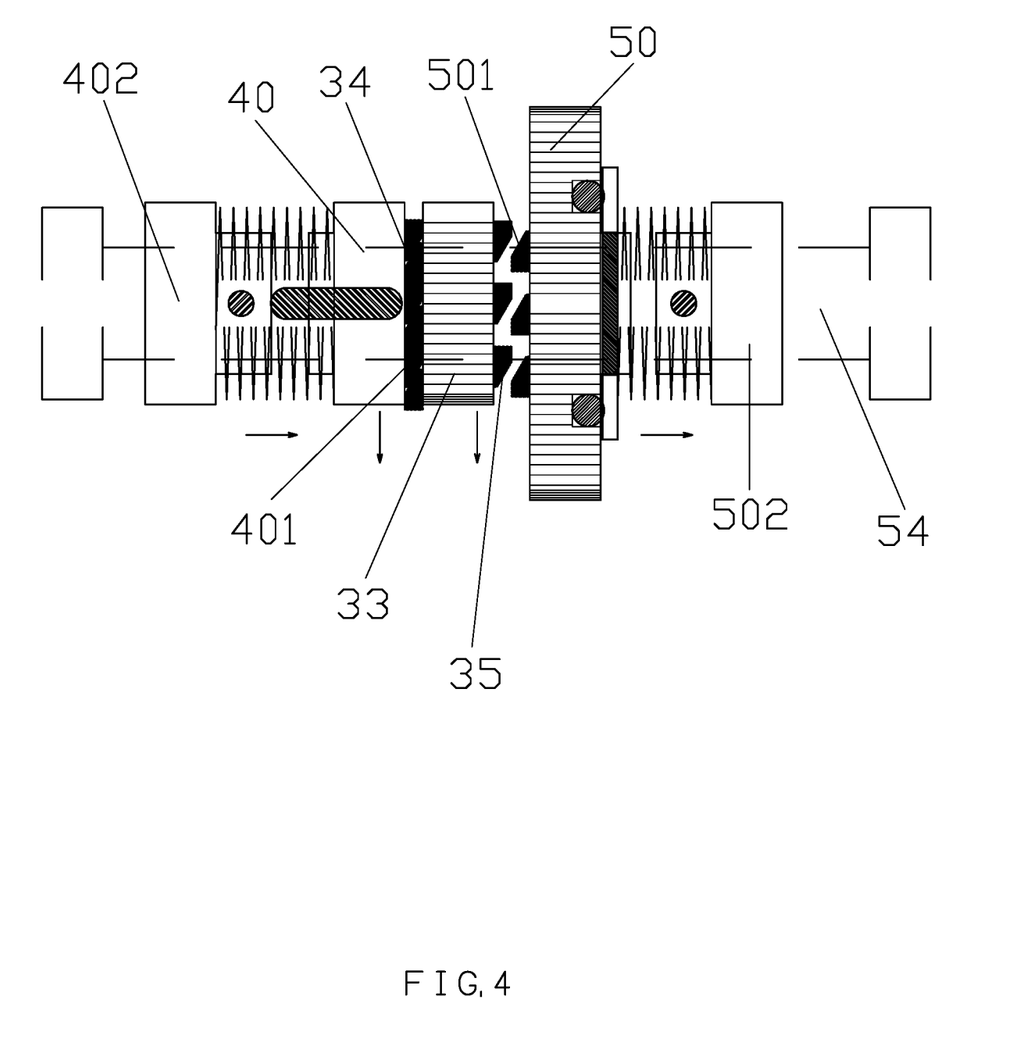
FIG. 4 is another cross sectional view showing the operation of the gear device for the clutch according to the preferred embodiment of the present invention.
Figure 5:
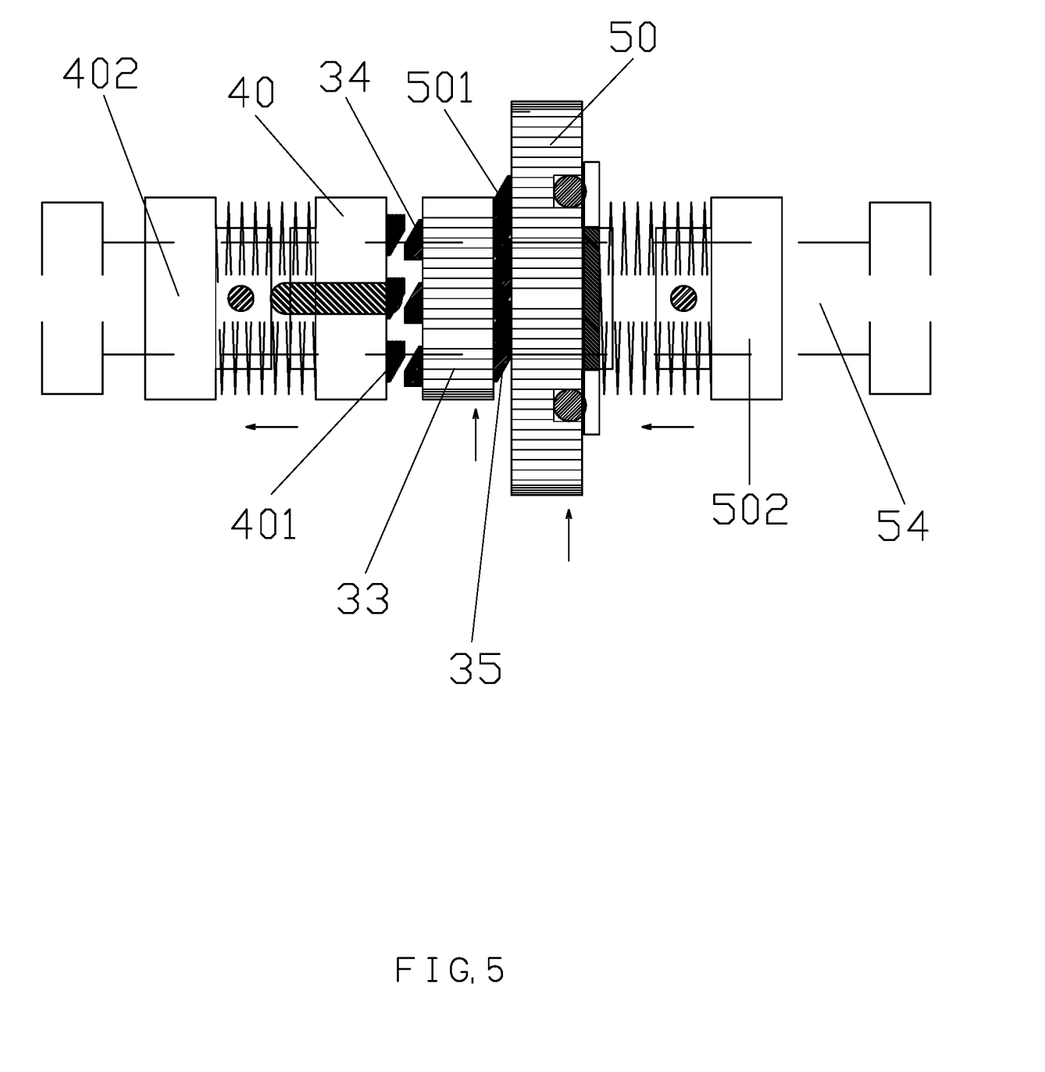
FIG. 5 is also another cross sectional view showing the operation of the gear device for the clutch according to the preferred embodiment of the present invention.

Referring to FIGS. 3-5, in a stationary state, the first resilient element 43 of the first clutching member 40 and the second resilient element 55 of the second clutching member 50 push the drive gear 33, and the multiple first and second actuation protrusions 34, 35 engage with the multiple third and fourth actuation protrusions 401, 501 individually.

When the drive gear 33 rotates forward, the first resilient element 43 pushes the first clutching member 40 so that the flat top face of each third actuation protrusion 401 of the first clutching member 40 contacts with the flat top face of each first actuation protrusion 34 of the drive gear 33, and the beveled face of each second actuation protrusion 35 of the drive gear 33 engages with the beveled face of each fourth actuation protrusion 501, hence the second clutching member 50 is pushed outward and does not engage with the second clutching member 50.

When the drive gear 33 rotates rearward, the second resilient element 55 pushes the second clutching member 50 so that the flat top face of each second actuation protrusion 35 of the drive gear 33 contacts with the flat top face of each fourth actuation protrusion 501 of the second clutching member 50, and the beveled face of each second actuation protrusion 35 of the drive gear 33 engages with the beveled face of each fourth actuation protrusion 501. In the meantime, the beveled face of each first actuation protrusion 34 of the drive gear 33 engages with the beveled face of each third actuation protrusion 401 of the first clutching member 40 so that the first clutching member 40 is pushed outward.

When the drive gear 33 rotates forward, it engages with the first clutching member 40 or the second clutching member 50. For example, when the drive gear 33 rotates forward to engage with the first clutching member 40, the second clutching member 50 does not interrupt the gear device. When the drive gear 33 rotates forward to engage with the second clutching member 50, the first clutching member 40 does not interrupt the gear device.

Figure 6:
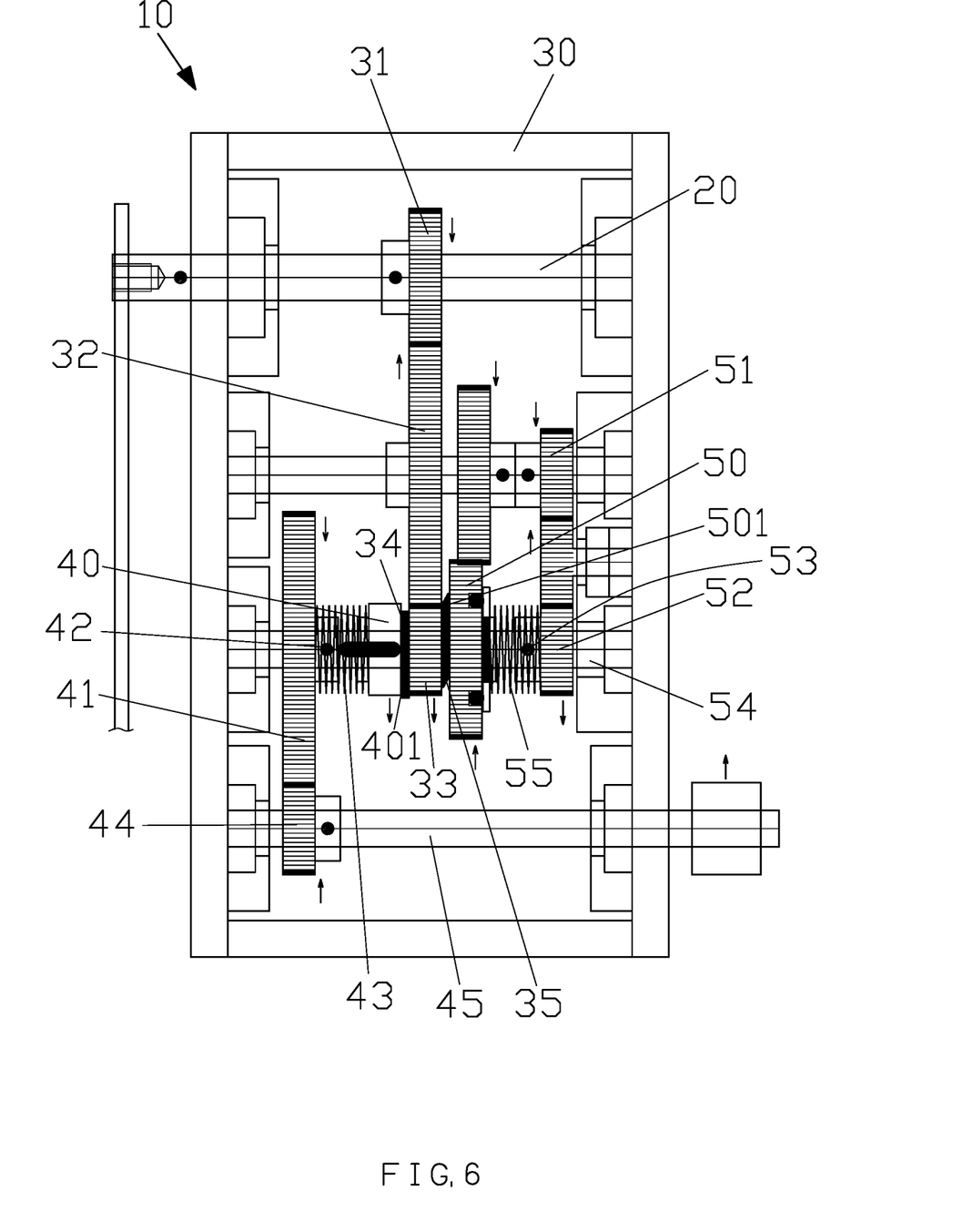
FIG. 6 is a cross sectional view showing the application of the gear device for the clutch according to the preferred embodiment of the present invention.
Figure 7:
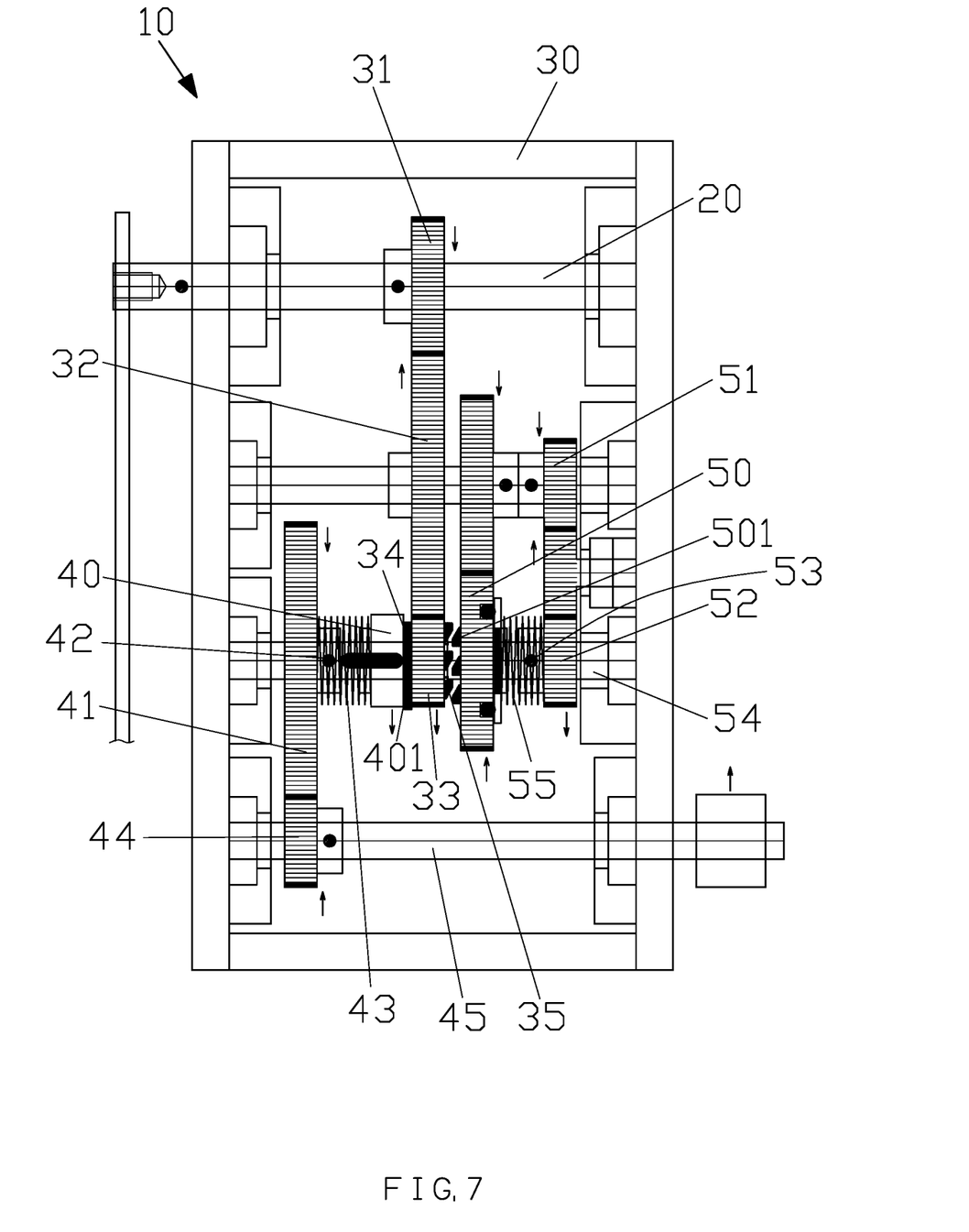
FIG. 7 is another cross sectional view showing the application of the gear device for the clutch according to the preferred embodiment of the present invention.
Figure 8:
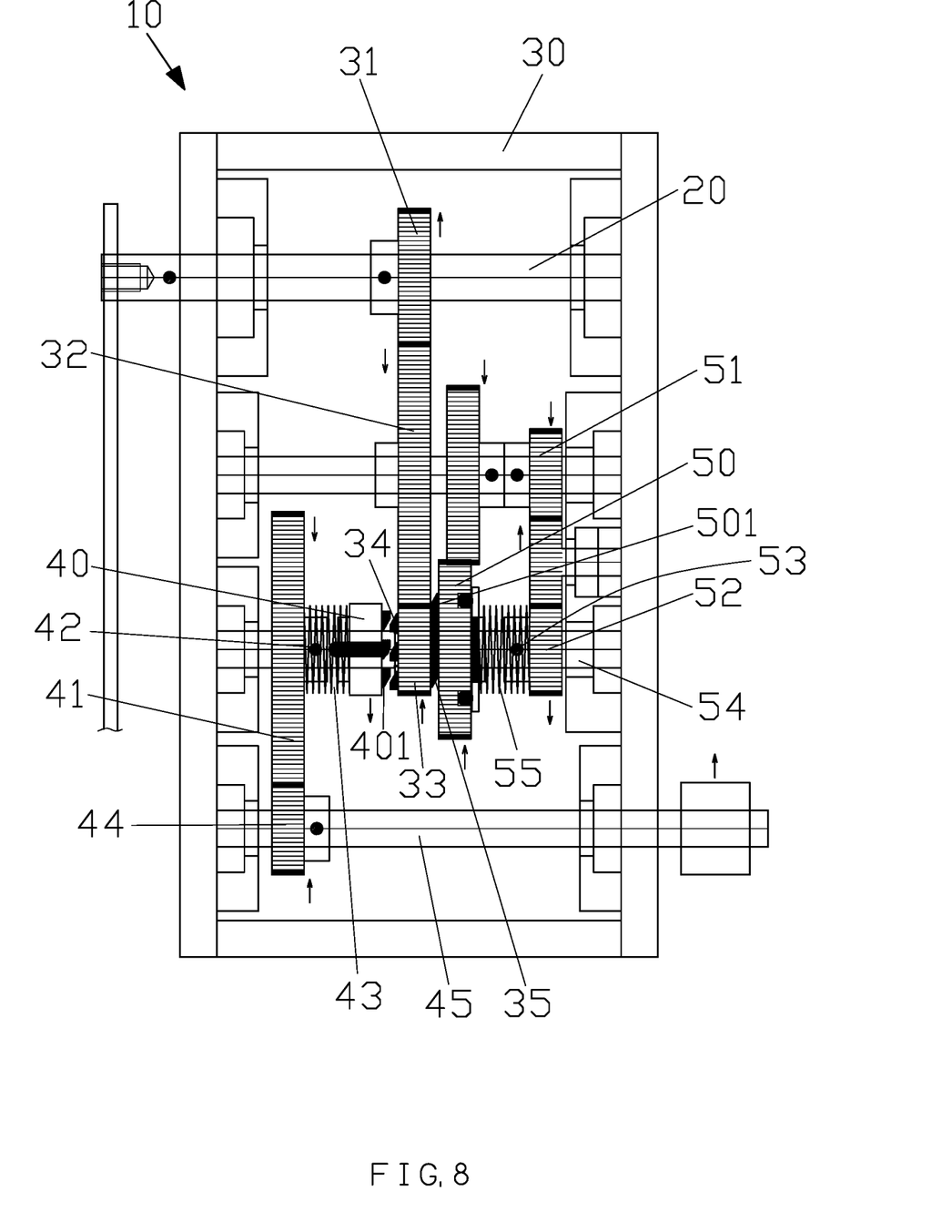
FIG. 8 is also another cross sectional view showing the application of the gear device for the clutch according to the preferred embodiment of the present invention.

As shown in FIGS. 6-8, the gear device comprises a body 10 including a gear box 30, and the gear box 30 includes a driving shaft 20 mostly accommodated therein so as to coaxially connect with an actuation gear 31, wherein a rear end of the actuation gear 31 meshes with and urges a driven gear 32 to engage with the driving gear 33, wherein the drive gear 33 is not connected on the gear shaft 54, and the drive gear 33 includes multiple first actuation protrusions 34 arranged around a peripheral side of a first surface thereof, and the drive gear 33 includes multiple second actuation protrusions 35 arranged around a peripheral side of a second surface thereof opposite to the multiple first actuation protrusions 34 respectively.

The first clutching member 40 is disposed on a gear shaft 54 outside the drive gear 33, and the first clutching member 40 includes multiple third actuation protrusions 401 arranged around a peripheral side of a first surface thereof and corresponding to the multiple first actuation protrusions 34 of the drive gear 33 respectively, wherein each of the multiple third actuation protrusions 401 has a beveled face and a flat top face connected with the beveled face of each third actuation protrusion 401, and the first clutching member 40 includes a first positioning disc 402 fitted on the gear shaft 54 adjacent to a second surface of the first clutching member 40. The first clutching member 40 further includes a transmission gear 41 mounted on the gear shaft 54, wherein the first resilient element 43 is defined between the first clutching member 40 and the transmission gear 41, and the transmission gear 41 meshes with an actuated gear 44 connected on a drive shaft 45 behind the gear shaft 54.

The second clutching member 50 is mounted on the gear shaft 54 adjacent to the drive gear 33, and the second clutching member 50 includes multiple fourth actuation protrusions 501 arranged around a peripheral side of a first surface thereof and corresponding to the multiple second actuation protrusions 35 of the drive gear 33 respectively, wherein each of the multiple fourth actuation protrusions 501 has a beveled face and a flat top face connected with the beveled face of each fourth actuation protrusion 501. The second clutching member 50 is not connected with the gear shaft 54 and further includes a transmitting gear assembly 51 in front of the second clutching member 50 and includes a direction changeable gear 52 located behind the transmitting gear assembly 51 and connected on the gear shaft 54, wherein the second resilient element 55 is defined between the second clutching member 50 and the second clutching member 50.

The transmission gear 41 has a first operation element 53 on the gear shaft 54, and the direction changeable gear 52 has a second operation element 42 on the gear shaft 54.

When the driving shaft 20 and the actuation gear 31 rotate clockwise or counterclockwise, the actuation gear 31 actuates the driven gear 32 and the drive gear 33 to revolve clockwise or counterclockwise.

When the actuation gear 31 rotates forward, the drive gear 33 revolves forward, each first actuation protrusion 34 of the drive gear 33 engages with each third actuation protrusion 401 of the first clutching member 40 so that the first clutching member 40 and the transmission gear 41 rotate forward simultaneously, and he actuated gear 44 revolves rearward. Meantime, the beveled face of each second actuation protrusion 35 of the drive gear 33 contacts with the beveled face of each fourth actuation protrusion 501 of the second clutching member 50, and the second clutching member 50 is pushed outward and does not contact with the drive gear 33.

When the actuation gear 31 rotates rearward, the drive gear 33 revolves rearward, and each second actuation protrusion 35 of the drive gear 33 contacts with each fourth actuation protrusion 501 of the second clutching member 50 so that the second clutching member 50 revolves rearward. Thereafter, the second clutching member 50 drives the transmitting gear assembly 51 to change a direction, and the direction changeable gear 52 revolves forward, such that the direction changeable gear 52 and the second operation element 42 are driven by the first operation element 53 and second operation element 42 respectively to revolve simultaneously, and the actuated gear 44 is actuated. In the meantime, the beveled face of each first actuation protrusion 34 of the drive gear 33 contacts with the beveled face of each third actuation protrusion 401 of the first clutching member 40 so that the first clutching member 40 is pushed outward.

The gear device operates clockwise and counterclockwise repeatedly so as to transmit kinetic energy constantly. Furthermore, the related components of the gear device are not interfered by ways of the drive gear 33, the first clutching member 40, and the second clutching 50. Preferably, the driven gear 32 and the actuated gear 44 rotate in a same direction by using the transmitting gear assembly 51 so that the drive shaft 45 operates smoothly.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A gear device for a clutch comprising: a drive gear, a first clutching member, and a second clutching member;

the drive gear including multiple first actuation protrusions arranged around a peripheral side of a first surface of the drive gear, and the drive gear includes multiple second actuation protrusions arranged around a peripheral side of a second surface of the drive gear opposite to the multiple first actuation protrusions respectively, wherein each of the multiple first actuation protrusions has a beveled face and a flat top face connected with the beveled face of each first actuation protrusion, and each of the multiple second actuation protrusions has a beveled face and a flat top face connected with the beveled face of each second actuation protrusion;

the first clutching member being disposed on a gear shaft outside the drive gear, and the first clutching member including multiple third actuation protrusions arranged around a peripheral side of a first surface of the first clutching member and corresponding to the multiple first actuation protrusions of the drive gear respectively, wherein each of the multiple third actuation protrusions has a beveled face and a flat top face connected with the beveled face of each third actuation protrusion, and the first clutching member includes a first positioning disc fitted on the gear shaft adjacent to a second surface of the first clutching member, wherein a first resilient element is defined between the first clutching member and the first positioning disc; and the second clutching member being mounted on the gear shaft adjacent to the drive gear, and the second clutching member including multiple fourth actuation protrusions arranged around a peripheral side of a first surface of the second clutching member and corresponding to the multiple second actuation protrusions of the drive gear respectively, wherein each of the multiple fourth actuation protrusions has a beveled face and a flat top face connected with the beveled face of each fourth actuation protrusion, and the second clutching member includes a second positioning disc fitted on the gear shaft adjacent to a second surface of the second clutching member, wherein a second resilient element is defined between the second clutching member and the second positioning disc.

2. A gear device for a clutch comprising:

a body including a gear box, and the gear box including a driving shaft mostly accommodated therein so as to coaxially connect with an actuation gear, wherein a rear end of the actuation gear meshes with and urges a driven gear to engage with the driving gear, and the drive gear is not connected on a gear shaft, and the drive gear comprises multiple first actuation protrusions arranged around a peripheral side of a first surface thereof, and the drive gear comprises multiple second actuation protrusions arranged around a peripheral side of a second surface thereof opposite to the multiple first actuation protrusions respectively;

a first clutching member disposed on the gear shaft outside the drive gear, and the first clutching member including multiple third actuation protrusions arranged around a peripheral side of a first surface of the first clutching member and corresponding to the multiple first actuation protrusions of the drive gear respectively, wherein the gear device further includes a transmission gear mounted on the gear shaft, wherein a first resilient element is defined between the first clutching member and the transmission gear, and the transmission gear meshes with an actuated gear connected on a drive shaft behind the gear shaft; a second clutching member mounted on the gear shaft adjacent to the drive gear, and the second clutching member including multiple fourth actuation protrusions arranged around a peripheral side of a first surface of the second clutching member and corresponding to the multiple second actuation protrusions of the drive gear respectively, wherein the second clutching member is not connected with the gear shaft and further includes a transmitting gear assembly in front of the second clutching member and includes a direction changeable gear located behind the transmitting gear assembly and connected on the gear shaft, wherein a second resilient element is defined between the second clutching member and the second positioning disc;

the first clutching member further including a transmission gear mounted on the gear shaft, wherein the first resilient element is defined between the first clutching member and the transmission gear, and the transmission gear meshes with the actuated gear connected on the drive shaft behind the gear shaft, wherein the transmission gear has a first operation element on the gear shaft, and the direction changeable gear has a second operation element on the gear shaft.

* * * * *